(12) United States Patent
Heisele (10) Patent No.: US 7,734,071 B2
(45) Date of Patent: Jun. 8, 2010

(54) SYSTEMS AND METHODS FOR TRAINING COMPONENT-BASED OBJECT IDENTIFICATION SYSTEMS

(75) Inventor: Bernd Heisele, Cambridge, MA (US)

(73) Assignee: Honda Motor Co., Ltd., Tokyo (JP)

( * ) Notice: Subject to any disclaimer, the term of this patent is extended or adjusted under 35 U.S.C. 154(b) by 738 days.

(21) Appl. No.: 10/882,981

(22) Filed: Jun. 30, 2004

(65) Prior Publication Data

US 2005/0036676 A1 Feb. 17, 2005

Related U.S. Application Data

(60) Provisional application No. 60/484,201, filed on Jun. 30, 2003.

(51) Int. Cl.
*G06K 9/00* (2006.01)

(52) U.S. Cl. .................. 382/118; 382/155; 382/227

(58) Field of Classification Search ........... 382/118, 382/155–161, 298, 227; 700/47, 48
See application file for complete search history.

(56) References Cited

U.S. PATENT DOCUMENTS

| | | | |
|---|---|---|---|
| 5,497,430 A * | 3/1996 | Sadovnik et al. ........... 382/156 |
| 5,850,470 A | 12/1998 | Kung et al. |
| 6,108,437 A | 8/2000 | Lin |
| 6,233,365 B1 * | 5/2001 | Teruhiko ................ 382/298 |
| 6,317,517 B1 | 11/2001 | Lu |
| 6,421,463 B1 * | 7/2002 | Poggio et al. ............ 382/224 |
| 6,671,391 B1 | 12/2003 | Zhang et al. |
| 6,975,750 B2 | 12/2005 | Yan et al. |
| 7,099,510 B2 * | 8/2006 | Jones et al. ............. 382/225 |
| 7,203,346 B2 | 4/2007 | Kim et al. |
| 7,218,759 B1 * | 5/2007 | Ho et al. ................. 382/118 |
| 2003/0044067 A1 | 3/2003 | Huang et al. |
| 2003/0110038 A1 * | 6/2003 | Sharma et al. ............ 704/270 |

(Continued)

FOREIGN PATENT DOCUMENTS

JP 07-065165 3/1995

(Continued)

OTHER PUBLICATIONS

Stewart et al., Region Growing with Pulse-Coupled Neural Networks: An Alternative to Seeded Region Growing, Nov. 2002, IEEE Transactions on Neural Networks, vol. 13, Issue: 16, pp. 1557-1562.*

(Continued)

*Primary Examiner*—Matthew C Bella
*Assistant Examiner*—Dennis Rosario
(74) *Attorney, Agent, or Firm*—Fenwick & West LLP; Mark E. Duell (57) ABSTRACT

Systems and methods are presented that determine components to use as examples to train a component-based face recognition system. In one embodiment, an initial component shape and size is determined, a training set is built, a component recognition classifier is trained, and the accuracy of the classifier is estimated. The component is then temporarily grown in each of four directions (up, down, left, and right) and the effect on the classifier's accuracy is determined. The component is then grown in the direction that maximizes the classifier's accuracy. The process can be performed multiple times in order to maximize the classifier's accuracy.

25 Claims, 5 Drawing Sheets

U.S. PATENT DOCUMENTS

2003/0225526 A1* 12/2003 Golub et al. .................. 702/19
2004/0064464 A1* 4/2004 Forman et al. .............. 707/100

FOREIGN PATENT DOCUMENTS

JP 2003-150963 5/2003
WO WO 2002/039371 A2 5/2002

OTHER PUBLICATIONS

Lin et al., Automatic Facial Feature Extraction by Applying Genetic Algorithms, Jun. 9-12, 1997, International Conference on Neural Networks, 1997, vol. 3, pp. 1363-1367.*

Heisele et al., Learning and Vision Machines, Jul. 2002, Proceedings of the IEEE, vol. 90,pp. 1164-1177.*

Heisele et al., Component-based Face Detection, 2001, Proceedings of the 2001 IEEE Computer Society Conference on Computer Vision and Pattern Recognition, 2001, vol. 1, pp. I-657-I-662.*

Heisele et al., Advances in Neural Information Processing Systems: Categorization by Learning and Combining Object Parts, 2002, MIT, vol. 2, Issue 14, unnumbered: 7 total pages.*

Heisele et al., Face Detection in Still Gray Images, May 2000, Massachusetts Institute of Technology, pp. 1-25.*

Heisele, B. et al., "Component-based Face Detection", Proceedings Of The IEEE Computer Society Conference On Computer Vision And Pattern Recognition (CVPR) 2001, Kauai, HI, vol. 1, Sep. 10, 2001, pp. 657-662.

PCT International Search Report and Written Opinion of the International Searching Authority, PCT/US2004/021158, Mar. 31, 2005.

Heisele, B. et al., "Learning and Vision Machines," Proceedings of the IEEE, vol. 90, No. 7, Jul. 2002, pp. 1164-1177.

Huang, J. et al., "Component-Based Face Recognition with 3D Morphable Models," Proceedings of the 4[th]International Conference on Audio- and Video-Based Biometric Person Authentication (AVBPA), Jun. 9-11, 2003 (Lecture Notes in Computer Science, vol. 2688), Springer-Verlag Berlin, Germany, pp. 27-34.

Kim, T-K et al., "Component-Based LDA Face Descriptor for Image Retrieval," Proceedings of the British Machine Vision Conference (BMVC), Sep. 2-5, 2002, vol. 2, pp. 507-516.

Viola, Paul, "Complex Feature Recognition: A Bayesian Approach for Learning to Recognize Objects," AI Memo No. 1591, Massachusetts Institute of Technology, Artificial Intelligence Laboratory, MA, Nov. 1996, pp. 1-21.

PCT International Search Report, PCT/IB2004/003274, Apr. 6, 2005.

Beymer, D. J., *Face Recognition Under Varying Pose*, A.I. Memo 1461, Center for Biological and Computational Learning, M.I.T., Cambridge, MA, 1993.

Blanz, V. et al., *A Morphable Model for the Synthesis of 3D Faces*, Computer Graphics Proceedings SIGGRAPH, pp. 187-194, Los Angeles, 1999.

Brunelli, R. et al., *Face Recognition: Features Versus Templates*, IEEE Transactions on Pattern Analysis and Machine Intelligence, 15(10), pp. 1042-1052, 1993.

Heisele, B. et al., *Face Recognition With Support Vector Machines: Global Versus Component-Based Approach*, Proc. 8th International Conference on Computer Vision, vol. 2, pp. 688-694, Vancouver, 2001.

Heisele, B. et al., *Categorization by Learning and Combining Object Parts*, Neural Information Processing Systems (NIPS), pp. 1239-1245, Vancouver, 2001.

Wallraven, C et al., *View-Based Recognition of Faces in Man and Machine: Re-visiting Inter-Extra-Ortho*, Lecture Notes in Computer Science, 2525, pp. 651-660, 2002.

Wiskott, L. et al., *Face Recognition by Elastic Bunch Graph Matching*, IEEE Transactions on Pattern Analysis and Machine Intelligence, 19(7), pp. 775-779, 1997.

Heisele, B., Component-based Object Recognition, Designing Tomorrow's Category-Level 3D Object Recognition Systems: An International Workshop, Taormina, Sicily, 2003.

Clippingdale, S. et al., "Performance Improvement and Database Registration in the Favret Face Detection, Tracking and Recognition System," Technical Report of the Institute of Electronics Information and Communication Engineers, Mar. 8, 2001, vol. 10, No. 701, pp. 111-118, Japan. (with English abstract).

Japanese Office Action, Japanese Patent Application No. 2006-516619, Feb. 16, 2010, 9 pages.

* cited by examiner

SYSTEMS AND METHODS FOR TRAINING COMPONENT-BASED OBJECT IDENTIFICATION SYSTEMS

CROSS-REFERENCE TO RELATED APPLICATION

This application claims priority from the following U.S. provisional patent application, which is hereby incorporated by reference: Ser. No. 60/484,201, filed on Jun. 30, 2003, entitled "Expectation Maximization of Prefrontal-Superior Temporal Network by Indicator Component-Based Approach."

BACKGROUND OF THE INVENTION

1. Field of the Invention

The present invention relates to component-based object identification systems. More particularly, the present invention relates to training component-based face recognition systems.

2. Description of Background Art

Face recognition techniques generally fall into two categories: global and component-based. In the global approach, one facial image is represented by one feature vector. This feature vector is input into a recognition classifier. The recognition classifier determines the identity of a person based on the feature vector.

In the component-based approach, one facial image is divided into several individual facial components, such as eyes, nose, and mouth. Each facial component is input into a different component recognition classifier. The outputs of the component recognition classifiers are then used to perform face recognition.

Before a component recognition classifier can be used, it should be trained. The better a classifier has been trained, the more accurately it will perform. One way to train a classifier is to present it with a set of examples. Each example is an input-output pair that represents what the classifier should output given a particular input. In other words, the set of examples shown to the classifier determines how accurately the classifier will perform.

As a result, an important characteristic of any component-based object identification system is which components are used as examples to train the system. What is needed is a way to determine which components maximize the system's accuracy in distinguishing a particular object from another.

SUMMARY OF THE INVENTION

An important characteristic of any component-based object identification system is which components are used as examples to train the system. Components should maximize the system's accuracy in distinguishing a particular object from another. Systems and methods are presented that determine components to use as examples to train a component-based face recognition system.

In one embodiment, a system comprises a main program module, an initialization module, an extraction module, a training module, an estimation module, and a growing module. The initialization module determines a component (e.g., the component's size and shape) given a pre-selected point. The extraction module extracts a component from an image or a feature vector. The training module trains a component recognition classifier using a training set of images. The estimation module estimates the accuracy of a component recognition classifier. The growing module grows a component by expanding the component in one of four directions: up, down, left, or right.

In one embodiment, a method comprises determining an initial component shape and size, building a training set, training a component recognition classifier, and estimating the accuracy of the classifier. The component is then temporarily grown in each of four directions (up, down, left, and right) and the effect on the classifier's accuracy is determined. The component is then grown in the direction that maximizes the classifier's accuracy. The method can be performed multiple times in order to maximize the classifier's accuracy.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION OF THE EMBODIMENTS

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to an apparatus for performing the operations herein. This apparatus is specially constructed for the required purposes, or it comprises a general-purpose computer selectively activated or reconfigured by a computer program stored in the computer. Such a computer program is stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems are used with programs in accordance with the teachings herein, or more specialized apparatus are constructed to perform the required method steps. The required structure for a variety of these systems will appear from the description below. In addition, the present invention is not described with reference to any particular programming language. It will be appreciated that a variety of programming languages may be used to implement the teachings of the invention as described herein.

1. Object Detection, Object Recognition, and Face Recognition

The field of object detection deals with determining, based on an image, whether a particular type of object is present. The type of object may be, for example, a car, an animal, or a person. An object detection system performs a binary classification for an image. Detection classification distinguishes between objects of different types. Specifically, detection classification distinguishes between 1) an object of the particular type (a first class) and 2) the absence of an object of the particular types (a second class).

The field of object recognition deals with determining, based on an image, whether a particular object is present. The object may be, for example, a car, an animal, or a person. An object recognition system performs a multi-class classification for an image. Recognition classification distinguishes between objects of the same type. Specifically, recognition classification reflects which particular object an image shows. For example, if an image could show one of three objects, recognition classification would reflect whether the image showed the first object (a first class), the second object (a second class), or the third object (a third class).

Face recognition is a type of object identification. Over the years, many computers systems have been developed to perform face recognition. Despite the success of some of these systems in constrained scenarios, the general task of face recognition still poses a number of challenges with respect to changes in illumination, facial expression, and pose.

Face recognition techniques generally fall into two categories: global and component-based. In the global approach, a classification is made using an entire image. For example, a single feature vector representing an entire face image is input into a recognition classifier. The recognition classifier then determines the identity of the person based on the feature vector. Several recognition classifiers have been proposed, including minimum distance classification in the eigenspace, Fisher's discriminant analysis, and neural networks. Global techniques work well for classifying frontal views of faces. However, they are not robust against pose changes. This is because global features are highly sensitive to translation and rotation of the face.

To avoid this problem, an alignment stage can be added before classifying the face. Aligning an input face image with a reference face image requires computing correspondences between the two face images. The correspondences are usually determined for a small number of prominent points in the face, such as the center of each eye, the nostrils, or the corners of the mouth. Based on these correspondences, the input face image can be warped to a reference face image.

In the component-based approach, a classification is made using components of an image. Components are detected and then input into a classification system. The component-based approach compensates for pose changes by allowing the geometrical relation between components to be flexible in a recognition classification stage. Several component-based recognition techniques have been developed. In one technique, templates of three facial regions (both eyes, nose, and mouth) are independently matched. The configuration of the components (facial regions) is unconstrained during classification, since the system does not include a geometrical model of the face. Another technique is similar but also includes an alignment stage. Yet another technique implements a geometrical model of a face using a two-dimensional elastic graph. Recognition is based on wavelet coefficients that are computed on the nodes of the elastic graph. Yet another technique shifts a window over a face image and computes discrete cosine transform (DCT) coefficients within the window. The coefficients are then fed into a two-dimensional Hidden Markov Model.

A main problem of any component-based approach to object identification is how to choose the set of components that will be used to identify the object. What is needed is a way to determine components that distinguish a particular object from another.

2. System for Face Recognition

Although the following description addresses a system for face recognition, the system can be used to identify any type of object. Possible classes of objects include, for example, cars, animals, and people.

a. Architecture

Figure 1:
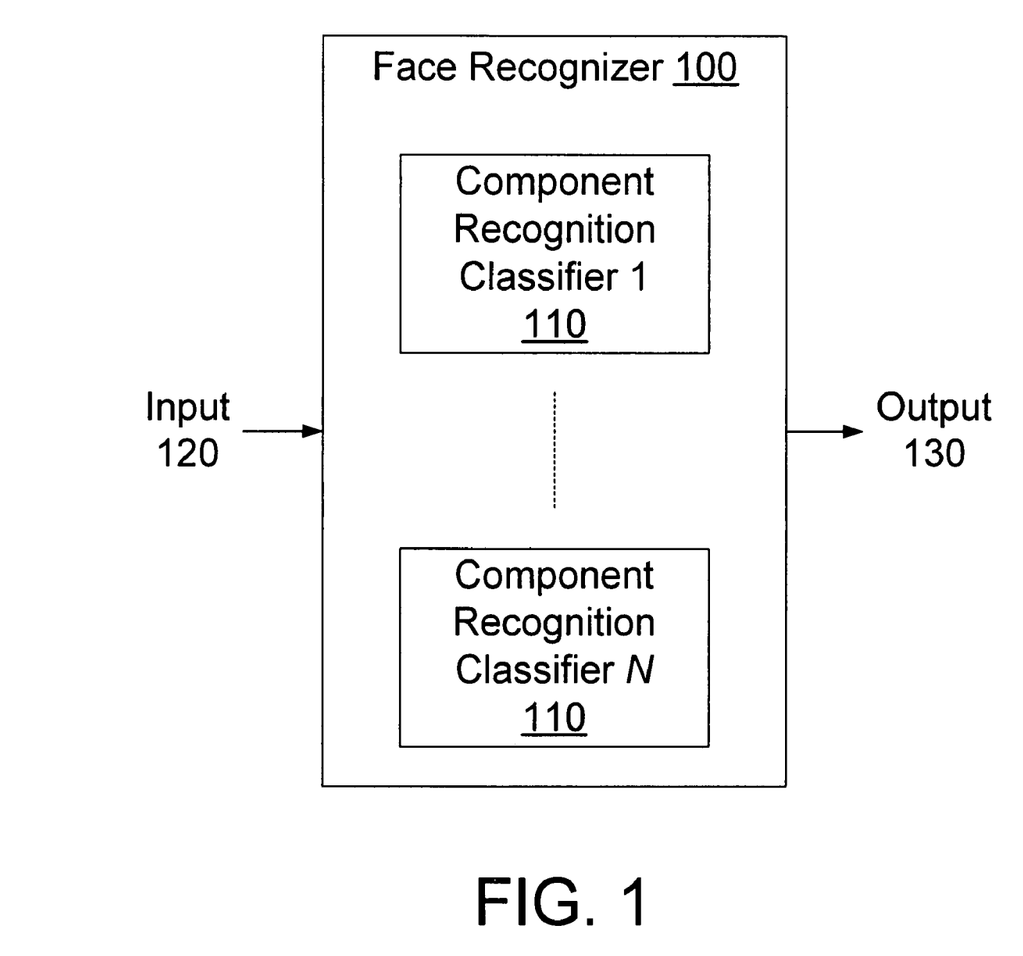
FIG. 1 illustrates a block diagram of a system for performing face recognition using a component-based technique, according to one embodiment of the invention.

FIG. 1 illustrates a block diagram of a system for performing face recognition using a component-based technique, according to one embodiment of the invention. Face recognizer 100 is a multi-class classifier in that it can identify particular people. Face recognizer 100 includes one or more component recognition classifiers 110. In the illustrated embodiment, face recognizer 100 includes N component recognition classifiers 110.

A component recognition classifier 110 classifies a component. For example, if each person is a class, then a component recognition classifier 110 determines to which person a given component belongs. The input to the component recognition classifier 110 comprises the given component, while the output of the component recognition classifier 110 comprises the identity of the person.

In one embodiment, the input to a component recognition classifier 110 is an image of the given component. In another embodiment, the input is a feature vector of the given component. In one embodiment, the output of a component recognition classifier 110 is the probability that the given component belongs to a particular person. In another embodiment, the output of a component recognition classifier 110 is a set of probabilities, such as a probability vector. This set contains, for each person, the probability (between 0 and 1) that a given component belongs to that person. In this embodiment, the sum of the probabilities in the set is 1.

As discussed above, a component recognition classifier 110 determines to which person a given component belongs. Thus, a component recognition classifier 110 performs multi-class classification. While a component recognition classifier 110 can comprise a multi-class classifier, it does not have to. Instead, it can comprise several binary classifiers.

In one embodiment, if a component recognition classifier 110 comprises several binary classifiers, the component recognition classifier 110 is trained according to the one-versus-all approach. Specifically, the binary classifiers are trained. In this embodiment, a binary classifier separates a single class (person) from all other classes (people) based on an input image. This input image is an image of a facial component. In other words, the components of one person are trained against the components of all the other people in the training set. In one embodiment, each binary classifier is responsible for recognizing a different person. In this embodiment, the number of binary classifiers that are trained is equal to the number of people that are to be identified. As a result, the number of binary classifiers scales linearly with the number of classes (e.g., the number of people that are to be identified).

In another embodiment, if a component recognition classifier 110 comprises several binary classifiers, the component recognition classifier 110 is trained according to the pairwise approach. In this embodiment, if the number of people that are to be identified is q, then the number of binary classifiers that are trained is equal to $q(q-1)/2$. Each binary classifier separates a pair of classes. The pairwise binary classifiers are arranged in trees, where a tree node represents a binary classifier. In one embodiment, the tree is a bottom-up tree similar to the elimination tree used in tennis tournaments. In another embodiment, the tree has a top-down tree structure.

A component recognition classifier 110 can comprise, for example, a neural network classifier (multi-class), a nearest-neighbor classifier (multi-class), or a support vector machine classifier (binary).

Figure 2:
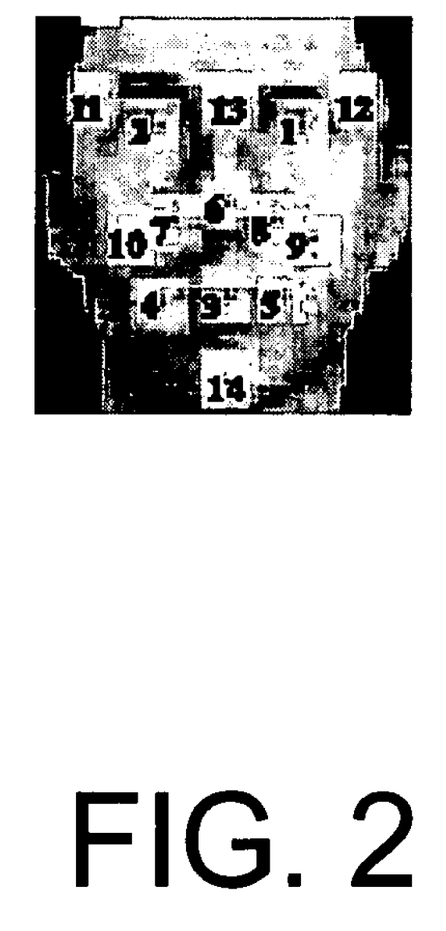
FIG. 2 illustrates a facial image showing fourteen components, according to one embodiment of the invention.

Face recognizer 100 includes one component recognition classifier 110 for each component used to perform face recognition. Thus, in the illustrated embodiment, face recognizer 100 would use N components to perform face recognition. In one embodiment, face recognizer 100 includes fourteen component recognition classifiers 110. FIG. 2 illustrates a facial image showing fourteen components, according to one embodiment of the invention. In the illustrated embodiment, most of the components are located in the vicinity of the eyes, nose, and mouth. In one embodiment, component recognition classifiers 110 operate independently of each other.

FIG. 1 also shows one input 120 to face recognizer 100 and one output 130 from face recognizer 100. In one embodiment, input 120 is a set of N images of components or a set of N feature vectors of components. In this embodiment, each component in the set is input into one of the N component recognition classifiers 110. In another embodiment, input 120 is an image of a face or a feature vector representing a face. In this embodiment, N components are identified in the face and then extracted. In one embodiment, this is a manual process. In another embodiment, this is performed automatically by a component detector (such as a classifier). Once the components have been extracted, this embodiment is similar to the embodiment previously described, where input 120 is a set of N images of components or a set of N feature vectors of components.

In one embodiment, output 130 of face recognizer 100 is the name of the person who is associated with input 120. Output 130 is determined based on the outputs from component recognition classifiers 110.

In one embodiment, the output from a component recognition classifier 110 can be expressed as a probability vector of the form $\langle p_{i1}, p_{i2}, \ldots, p_{iM} \rangle$, where $p_{ij}$ is the probability that component i belongs to person j and there are M classes (people) to choose from. Using this notation, the outputs from N component recognition classifiers 110 can be expressed as:

$$\langle p_{11}, p_{12}, \ldots, p_{1M} \rangle, \langle p_{21}, p_{22}, \ldots, p_{2M} \rangle, \ldots, \langle p_{N1}, p_{N2}, p_{NM} \rangle$$

In one embodiment, output 130 is determined by combining the outputs from N component recognition classifiers 110 using standard techniques for classifier combination. In one embodiment, output 130 is based on the sum of the outputs from the N component recognition classifiers 110. In this embodiment, the sum of the outputs can be expressed as the following sum vector:

$$\langle p_{11}+p_{21}+\ldots+p_{N1}, p_{12}+p_{22}+\ldots+p_{N2}, \ldots, p_{1M}+p_{2M}+\ldots+p_{NM} \rangle$$

In this embodiment, output 130 would be the person corresponding to the largest probability in the sum vector.

In another embodiment, output 130 is based on the product of the outputs from the N component recognition classifiers 110. In this embodiment, the product of the outputs can be expressed as the following product vector:

$$\langle p_{11} \cdot p_{21} \cdot \ldots \cdot p_{N1}, p_{12} \cdot p_{22} \cdot \ldots \cdot p_{N2}, \ldots, p_{1M} \cdot p_{2M} \cdot \ldots \cdot p_{NM} \rangle$$

Output 130 would be the person corresponding to the largest probability in the product vector.

In yet another embodiment, output 130 is based a voting scheme among the outputs from the N component recognition classifiers 110. In one embodiment, a threshold value is used to convert each output to a number of votes for one or more people. For example, if the threshold value were 0.5, then each probability in a probability vector output by a component recognition classifier 110 that was greater than or equal to 0.5 would correspond to one vote for that person. As another example, each component recognition classifier 110 would get only one vote, and that vote would be for the person with the highest probability in the probability vector output by that component recognition classifier 110. The votes are then tallied, and output 130 is the person who obtained the most votes.

In another embodiment, output 130 is determined by using another classifier, such as a decision classifier.

b. Training

Before face recognizer 100 can perform face recognition, it should be trained. Specifically, component recognition classifiers 110 should be trained. A classifier is able to perform a task (e.g., identify a particular person based on a component of that person) because the classifier has been trained using supervised learning, also known as learning-from-examples. As the name implies, a classifier is trained using a set of examples. Each example is an input-output pair that represents what a classifier should output given a particular input.

As discussed above, an important characteristic of any component-based object identification system is which components are used as examples to train the system. The training should maximize the system's accuracy in distinguishing a particular object from another.

3. Determining Components to Use as Examples to Train System for Face Recognition In one embodiment, object components are determined automatically and then used as examples to train component-based face recognition systems. This differs from the prior art, where object components were selected manually.

Figure 3:
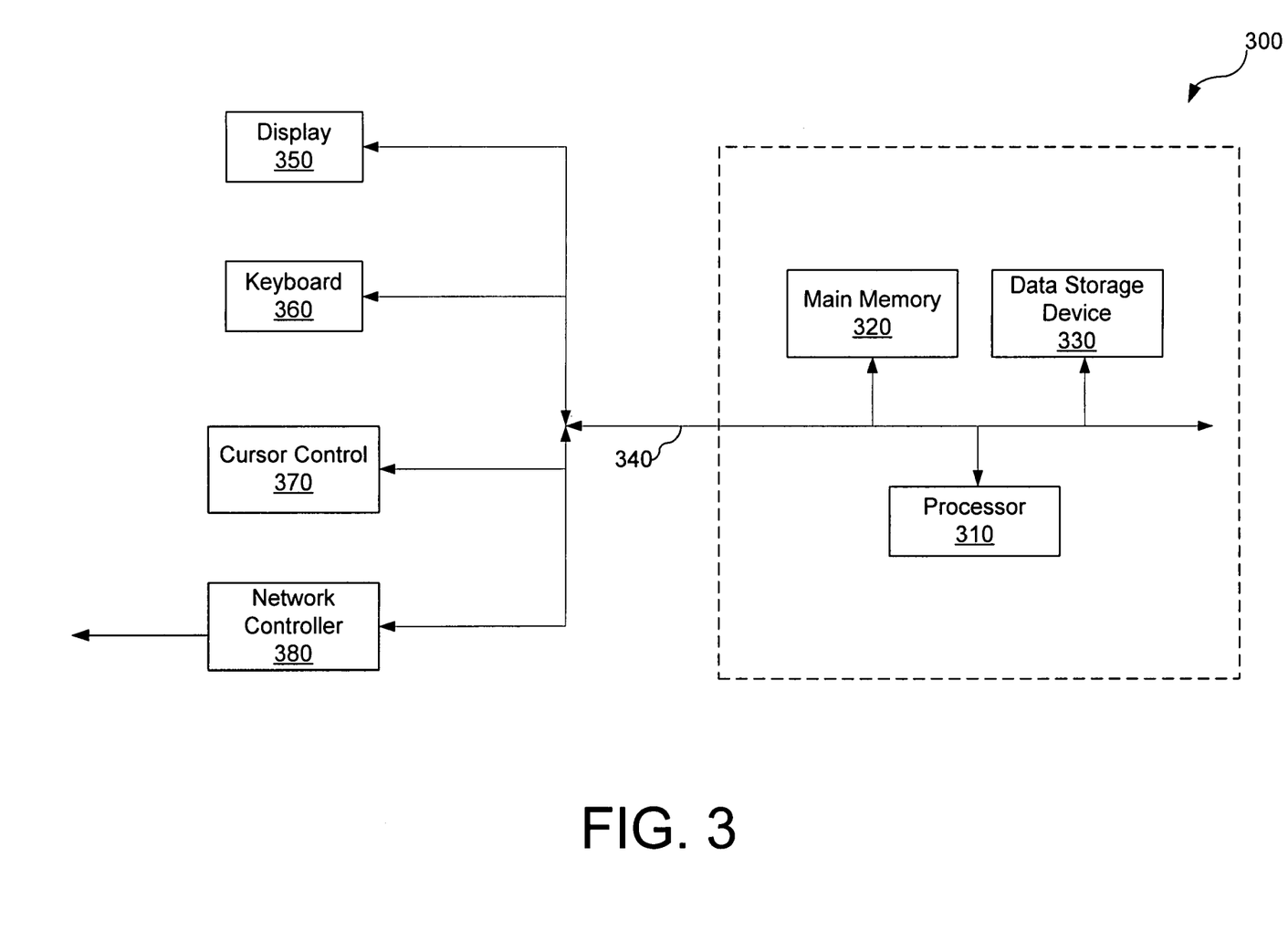
FIG. 3 illustrates a block diagram of an apparatus for determining components to use as examples to train a component-based face recognition system, according to one embodiment of the invention.

FIG. 3 illustrates a block diagram of an apparatus for determining components to use as examples to train a component-based face recognition system, according to one embodiment of the invention. Apparatus 300 preferably includes a processor 310, a main memory 320, a data storage device 330, and an input/output controller 380, all of which are communicatively coupled to a system bus 340. Apparatus 300 can be, for example, a general-purpose computer.

Processor 310 processes data signals and comprises various computing architectures including a complex instruction set computer (CISC) architecture, a reduced instruction set computer (RISC) architecture, or an architecture implementing a combination of instruction sets. Although only a single processor is shown in FIG. 3, multiple processors may be included.

Main memory 320 stores instructions and/or data that are executed by processor 310. The instructions and/or data comprise code for performing any and/or all of the techniques described herein. Main memory 320 is preferably a dynamic random access memory (DRAM) device, a static random access memory (SRAM) device, or some other memory device known in the art.

Data storage device 330 stores data and instructions for processor 310 and comprises one or more devices including a hard disk drive, a floppy disk drive, a CD-ROM device, a DVD-ROM device, a DVD-RAM device, a DVD-RW device, a flash memory device, or some other mass storage device known in the art.

Network controller 380 links apparatus 300 to other devices so that apparatus 300 can communicate with these devices.

System bus 340 represents a shared bus for communicating information and data throughout apparatus 300. System bus 340 represents one or more buses including an industry standard architecture (ISA) bus, a peripheral component interconnect (PCI) bus, a universal serial bus (USB), or some other bus known in the art to provide similar functionality.

Additional components that may be coupled to apparatus 300 through system bus 340 include a display device 350, a keyboard 360, and a cursor control device 370. Display device 350 represents any device equipped to display electronic images and data to a local user or maintainer. Display device 350 is a cathode ray tube (CRT), a liquid crystal display (LCD), or any other similarly equipped display device, screen, or monitor. Keyboard 360 represents an alphanumeric input device coupled to apparatus 300 to communicate information and command selections to processor 310. Cursor control device 370 represents a user input device equipped to communicate positional data as well as command selections to processor 310. Cursor control device 370 includes a mouse, a trackball, a stylus, a pen, cursor direction keys, or other mechanisms to cause movement of a cursor.

It should be apparent to one skilled in the art that apparatus 300 includes more or fewer components than those shown in FIG. 3 without departing from the spirit and scope of the present invention. For example, apparatus 300 may include additional memory, such as, for example, a first or second level cache or one or more application specific integrated circuits (ASICs). As noted above, apparatus 300 may be comprised solely of ASICs. In addition, components may be coupled to apparatus 300 including, for example, image scanning devices, digital still or video cameras, or other devices that may or may not be equipped to capture and/or download electronic data to/from apparatus 300.

Figure 4:
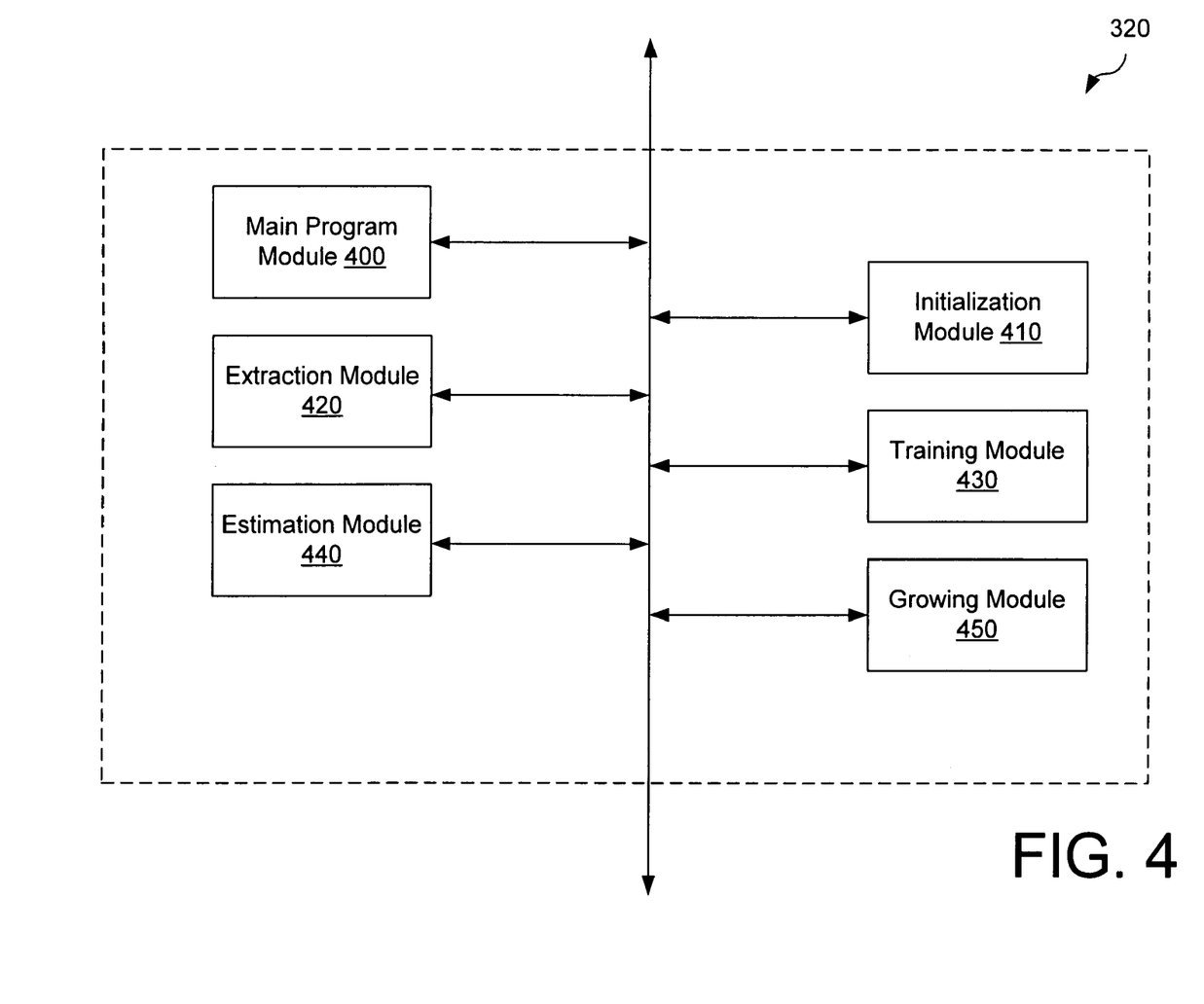
FIG. 4 illustrates a more detailed block diagram of the contents of the memory unit in FIG. 3.

FIG. 4 illustrates a more detailed block diagram of the contents of the memory unit in FIG. 3. Generally, memory unit 320 comprises several code modules for determining components to use as examples to train a component-based face recognition system. Specifically, the code modules in memory unit 320 include main program module 400, initialization module 410, extraction module 420, training module 430, estimation module 440, and growing module 450.

In one embodiment, memory unit 320 determines a component of an image by starting with a small seed region and then iteratively growing the region. The direction of growth is chosen based on the effect that the grown component will have on the accuracy of the classifier when the classifier has been trained using that grown component. Once the components have been determined, they are used to train a component recognition classifier 110.

Main program module 400 is communicatively coupled to all code modules 410, 420, 430, 440, and 450. Main program module 400 centrally controls the operation and process flow of apparatus 300, transmitting instructions and data to as well as receiving data from each code module 410, 420, 430, 440, and 450. Details of the operation of main program module 400 will be discussed below with reference to FIG. 5.

Initialization module 410 determines a component (e.g., the component's size and shape) given a pre-selected point. In one embodiment, the component contains the pre-selected point. In another embodiment, the component is small in size. In yet another embodiment, the initial component is rectangular in shape.

Extraction module 420 extracts a component from an image or a feature vector. In one embodiment, a component is extracted based on its size, shape, and location.

Training module 430 trains a component recognition classifier 110 using a training set of images. As discussed above, a classifier is trained using a set of examples. Each example is an input-output pair that represents what a classifier should output given a particular input. Here, an example is a pair where the input is an image from the training set and the output is the identity of the person associated with the image. In one embodiment, an example exists for each image in the training set. Training module 430 uses these examples to train a component recognition classifier 110.

Estimation module 440 estimates the accuracy of a component recognition classifier 110. In one embodiment, the accuracy is based on the recognition rate when the trained component recognition classifier 110 is run on a cross-validation set. In this embodiment, components are extracted from all images in the cross-validation set based on known reference points. Analogous to the training data, the positive cross-validation set includes the components of one person, and the negative set includes the components of all other people. The recognition rate on the cross-validation set is then determined. In another embodiment, the accuracy is an SVM error bound (such as the expected error probability) of the component recognition classifier 110.

Growing module 450 grows a component by expanding the component in one of four directions: up, down, left, or right. In one embodiment, growing module 450 expands a component by one pixel in the specified direction.

Figure 5:
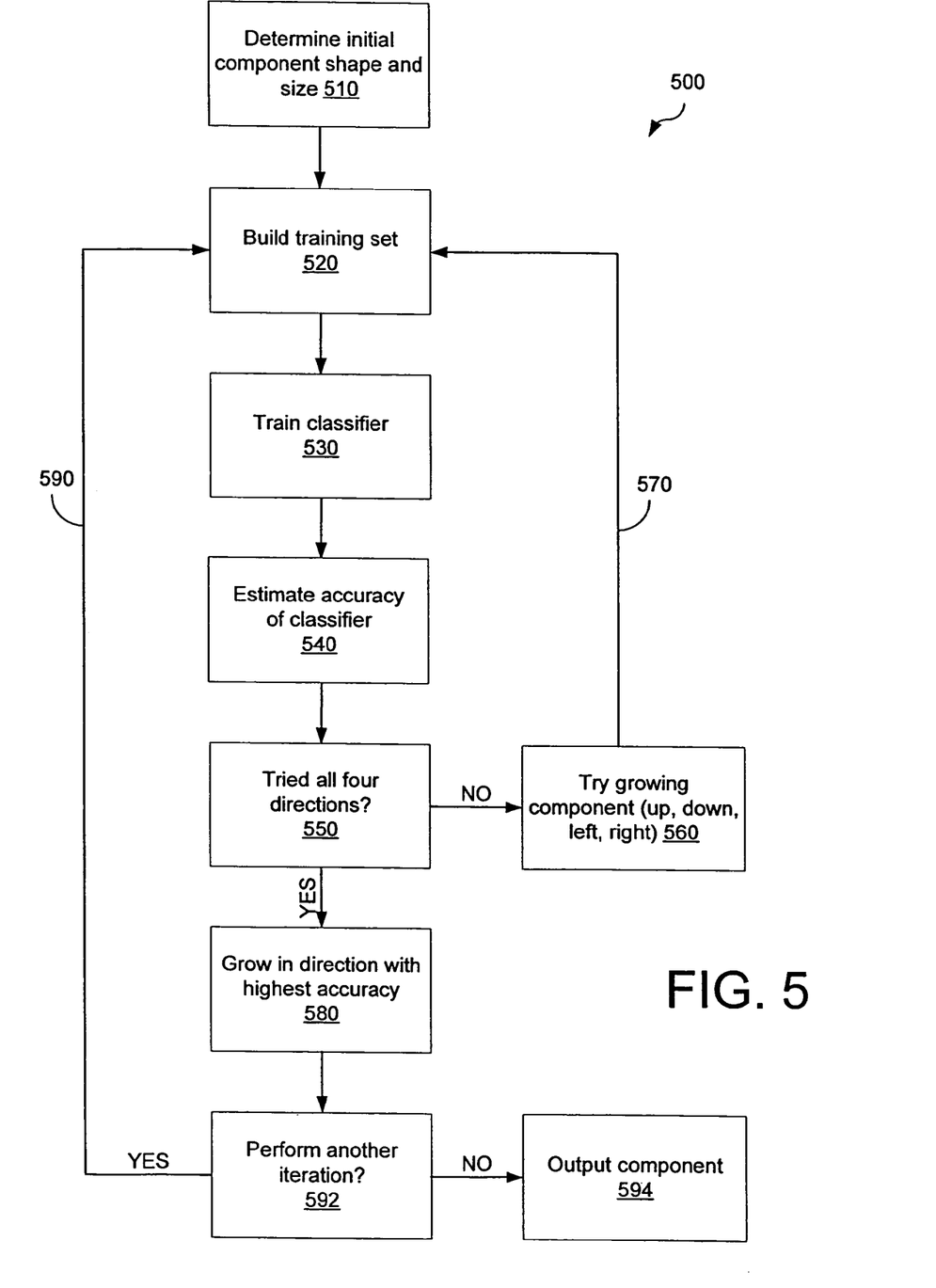
FIG. 5 illustrates a method for determining components to use as examples to train a component-based face recognition system, according to one embodiment of the invention.

FIG. 5 illustrates a method for determining components to use as examples to train a component-based face recognition system, according to one embodiment of the invention. In one embodiment, method 500 is performed once for each component recognition classifier 110 in face recognizer 100. The components determined from a particular execution of method 500 are then used to train that particular component recognition classifier 110 using supervised learning.

Before method 500 begins, a location of a point is specified in an object image. For example, if the object is a face and the component recognition classifier 110 is focused on the eye area, the point can be at the center of the left eye. In one embodiment, the location of the point is input manually. In another embodiment, the location is determined automatically; for example, by inputting the image into an eye detector.

Method 500 begins with main program module 400 determining 510 an initial component size and shape based on the specified point using initialization module 410. Main program module 400 builds 520 a training set for the component recognition classifier 110 by extracting the determined component from each available face image using extraction module 420. Main program module 400 trains 530 the component recognition classifier 110 using the training set and training module 430. After the training is finished, main program module 400 estimates 540 the accuracy of the component recognition classifier 110 using estimation module 440.

Main program module 400 then determines 550 whether it has tried growing the component in all four directions (up, down, left, and right). If main program module 400 has not tried growing the component in all four directions, it temporarily grows the component in one of the directions which it has not yet tried using growing module 450. After the component is grown, method 500 returns 570 to step 520 and a training set is built.

If main program module 400 has tried growing the component in all four directions, it determines which direction of growth (up, down, left, or right) resulted in the highest accuracy as estimated in step 540. The component is then permanently grown 580 in that direction using growing module 450.

Main program module 400 then determines 592 whether to perform another iteration and thereby try to grow the component again in order to maximize the accuracy. If another iteration is to be performed, then method 500 returns 590 to step 520 and a training set is built. If another iteration is not to be performed, then main program module 400 outputs 594 a component and method 500 ends.

In one embodiment, another iteration is not performed when accuracy decreases as a result of growing the component in each of the four directions. In another embodiment, another iteration is not performed when accuracy decreases as a result of growing the component in any of the four directions. In these embodiments, main program module 400 outputs 594 the previous component to the component that caused accuracy to decrease.

In yet another embodiment, another iteration is not performed when a threshold number of iterations has been reached. In this embodiment, main program module 400 outputs 594 whichever component maximized the accuracy.

Although the invention has been described in considerable detail with reference to certain embodiments thereof, other embodiments are possible as will be understood to those skilled in the art. For example, another embodiment is described in "Components for Face Recognition" by B. Heisele and T. Koshizen, Proceedings of the Conference on Automatic Face and Gesture Recognition, Seoul, Korea, 2004, pp. 153-158, which is hereby incorporated by reference.

What is claimed is:

1. A method for determining a component, the component to be used by a component-based object identification system, the method comprising:
using a processor to determine an accuracy of a first component recognition classifier, wherein the first component recognition classifier determines to which class a given component belongs and was trained based on a first component, the first component representing a first object region;
determining a set of enlarged components, an enlarged component being larger than the first component, the enlarged component representing a second object region, wherein the second object region is larger than the first object region and contains the first object region;
for each enlarged component in the set of enlarged components, determining an accuracy of a second component recognition classifier, wherein the second component recognition classifier determines to which class a particular component belongs and was trained based on the enlarged component;
determining, from among the first component recognition classifier and each second component recognition classifier, which component recognition classifier is most accurate; and
determining which component was used to train the most accurate component recognition classifier.

2. The method of claim 1, wherein the first component is determined manually.

3. The method of claim 1, wherein the first component is determined automatically by a component detector.

4. The method of claim 1, wherein a component recognition classifier that was trained based on a component was trained using a training set, the training set comprising:
a set of component images; and
for each component image in the set of component images, a class associated with that component image.

5. The method of claim 4, wherein a component image was generated by extracting the component from an image.

6. The method of claim 1, wherein a component recognition classifier's accuracy comprises the component recognition classifier's recognition rate.

7. The method of claim 6, wherein determining the component recognition classifier's accuracy comprises using the component recognition classifier to classify elements in a cross-validation set.

8. The method of claim 7, wherein the cross-validation set comprises:
a set of component images, wherein a component image was generated by extracting the component from an image; and
for each component image in the set of component images, a class associated with that component image.

9. The method of claim 1, wherein determining the set of enlarged components comprises expanding the first component in one of four directions: up, down, left, or right.

10. The method of claim 1, wherein a component recognition classifier's accuracy is based on the component recognition classifier's expected probability of error.

11. The method of claim 1, wherein the component recognition classifier's accuracy is based on an estimated upper bound on the component recognition classifier's expected probability of error.

12. The method of claim 1, wherein the component comprises a portion of a face, and wherein the class of the component is a particular person.

13. The method of claim 1, wherein the component-based object identification system comprises a component-based face recognition system.

14. The method of claim 1, wherein the first component is an image.

15. The method of claim 1, wherein the first component is a feature vector.

16. A system for determining a component, the component to be used by a component-based object identification system, the system comprising:

means for determining an accuracy of a first component recognition classifier, wherein the first component recognition classifier determines to which class a given component belongs and was trained based on a first component, the first component representing a first object region;

means for determining a set of enlarged components, an enlarged component being larger than the first component, the enlarged component representing a second object region, wherein the second object region is larger than the first object region and contains the first object region;

means for determining, for each enlarged component in the set of enlarged components, an accuracy of a second component recognition classifier, wherein the second component recognition classifier determines to which class a particular component belongs and was trained based on the enlarged component;

means for determining, from among the first component recognition classifier and each second component recognition classifier, which component recognition classifier is most accurate; and means for determining which component was used to train the most accurate component recognition classifier.

17. The system of claim 16, wherein determining the set of enlarged components comprises expanding the first component in one of four directions: up, down, left, or right.

18. The system of claim 16, wherein the component comprises a portion of a face, and wherein the class of the component is a particular person, and wherein the component-based object identification system comprises a component-based face recognition system.

19. The system of claim 16, wherein the first component is an image.

20. The system of claim 16, wherein the first component is a feature vector.

21. A computer program product for determining a component, the component to be used by a component-based object identification system, the computer program product comprising a computer-readable medium containing computer program code for performing a method, the method comprising:

determining an accuracy of a first component recognition classifier, wherein the first component recognition classifier determines to which class a given component belongs and was trained based on a first component, the first component representing a first object region;

determining a set of enlarged components, an enlarged component being larger than the first component, the enlarged component representing a second object region, wherein the second object region is larger than the first object region and contains the first object region;

for each enlarged component in the set of enlarged components, determining an accuracy of a second component recognition classifier, wherein the second component recognition classifier determines to which class a particular component belongs and was trained based on the enlarged component;

determining, from among the first component recognition classifier and each second component recognition classifier, which component recognition classifier is most accurate; and determining which component was used to train the most accurate component recognition classifier.

22. The computer program product of claim 21, wherein determining the set of enlarged components comprises expanding the first component in one of four directions: up, down, left, or right.

23. The computer program product of claim 21, wherein the component comprises a portion of a face, and wherein the class of the component is a particular person, and wherein the component-based object identification system comprises a component-based face recognition system.

24. The computer program product of claim 21, wherein the first component is an image.

25. The computer program product of claim 21, wherein the first component is a feature vector.

* * * * *